United States Patent [19]

Arena

[11] Patent Number: 5,312,070
[45] Date of Patent: May 17, 1994

[54] SEGMENTED VARIABLE SWEEP WING AIRCRAFT

[75] Inventor: Aldo Arena, Smithtown, N.Y.

[73] Assignee: Grumman Aerospace Corporation, Bethpage, N.Y.

[21] Appl. No.: 862,318

[22] Filed: Apr. 2, 1992

[51] Int. Cl.⁵ .................................. B64C 3/38
[52] U.S. Cl. ........................ 244/46; 244/49; 244/218; 244/3.27; 244/3.28
[58] Field of Search ............ 244/45 R, 46, 47, 48, 244/49, 218, 3.27, 3.28

[56] References Cited

U.S. PATENT DOCUMENTS

| | | | |
|---|---|---|---|
| 1,466,551 | 8/1923 | Thurston | 244/218 |
| 1,888,418 | 11/1932 | Adams | 244/218 |
| 1,895,140 | 1/1933 | Stage | 244/46 |
| 2,793,826 | 5/1957 | Fiedler | 244/46 |
| 3,447,761 | 6/1969 | Whitener et al. | 244/46 |
| 3,795,374 | 3/1974 | Zech et al. | 244/46 |
| 4,106,727 | 8/1978 | Ortell | 244/49 |
| 4,212,441 | 7/1980 | Ascani, Jr. et al. | 244/46 |
| 4,358,077 | 11/1982 | Caronel | 244/46 X |
| 4,405,102 | 9/1983 | Taylor | 244/45 R |
| 4,635,881 | 1/1987 | Brieseck | 244/49 |
| 4,671,473 | 6/1987 | Goodson | 244/199 |
| 4,770,113 | 9/1988 | Walker | 114/102 |
| 4,869,441 | 9/1989 | Steuer | 244/49 |

Primary Examiner—Jesûs D. Sotelo
Assistant Examiner—Christopher P. Ellis
Attorney, Agent, or Firm—Carl J. Evens; Richard G. Geib; Daniel L. Gobetz

[57] ABSTRACT

A segmented variable sweep wing for an aircraft has a plurality of wing segments. A structural device movably affixes the wing segments to the fuselage of the aircraft adjacent each other at their root areas. The structural device moves the segments conjointly to a power position where the segments are perpendicular to the fuselage and spaced from each other. The structural device also moves the segments conjointly to a cruise position wherein the segments are swept back at an angle with the fuselage and in abutment with each other thereby forming a unitary continuous surface airfoil.

17 Claims, 6 Drawing Sheets

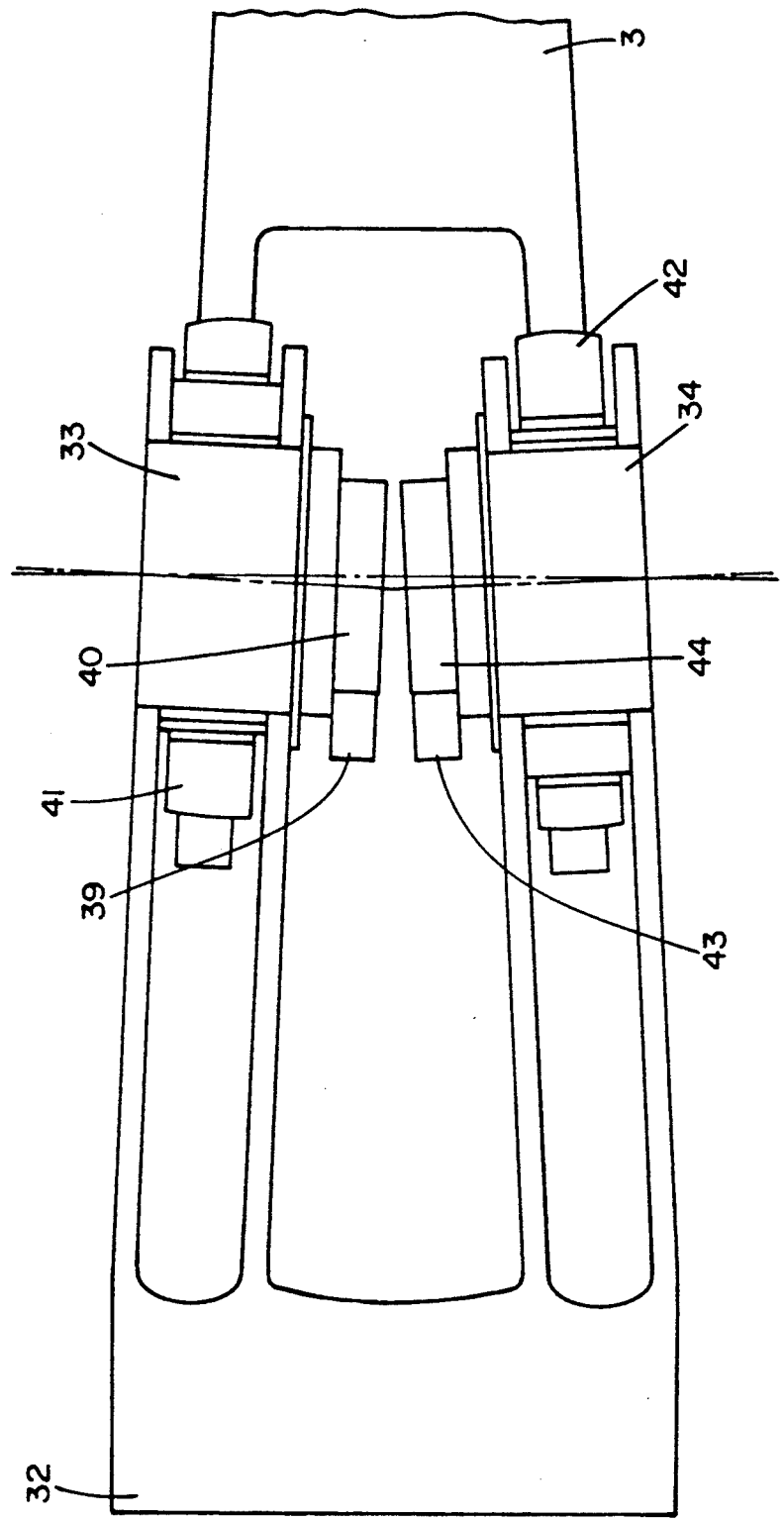

SEGMENTED VARIABLE SWEEP WING AIRCRAFT

BACKGROUND OF THE INVENTION

The present invention relates to a variable sweep wing aircraft. More particularly, the invention relates to an aircraft having a multitude of wings comprising a segmented variable sweep wing.

The requirements of high lift configurations of conventional wings are in conflict with structural requirements of wings. Conventional wings are equipped with high lift devices, such as slats and flaps, to assist in landing and take off. Modern aircraft require lightweight and efficient wing structures. The mechanical drive systems of conventional wings make it very difficult for them to be structured efficiently.

The principal object of the invention is to provide a variable sweep wing having a lighter weight and more efficient structure than a conventional wing of such type.

An object of the invention is to provide a variable sweep wing of simple structure which is mounted on the aircraft by relatively simple means and is controlled in sweep and configuration by simple means.

Another object of the invention is to provide a variable sweep wing of simple structure which is efficient, effective and reliable in operation at take off, cruise and landing of the aircraft.

Still another object of the invention is to provide a variable sweep wing which is of segmented structure and controllable in sweep position to provide a unitary continuous surface airfoil when swept back at an angle with the fuselage in a cruise position and the segments are spaced from each other when perpendicular or near perpendicular to the fuselage of the aircraft in a power or high lift position.

BRIEF SUMMARY OF THE INVENTION

In accordance with the invention, a segmented variable sweep wing for an aircraft comprises a plurality of wing segments positioned adjacent each other. Each segment has a root area movably affixed to the fuselage of the aircraft in a manner whereby the segments are conjointly movable to a power position wherein the segments are substantially perpendicular to the fuselage and spaced from each other and the segments are conjointly movable to a cruise position wherein the segments are swept back at an angle with the fuselage and substantially in abutment with each other thereby forming a substantially unitary continuous surface airfoil.

Each of the wing segments has a leading edge and a trailing edge and the trailing edge of each of the wing segments, except for a last of said wing segments, is shaped to fit in close contact with the leading edge of the next-succeeding wing segment.

Each of the wing segments is substantially pivotally affixed at its root area to the fuselage for movement in a plane substantially through the chord of the wing segment and is unrestricted in movement through said chord of said wing segment.

In accordance with the invention, a segmented variable sweep wing for an aircraft comprises a plurality of wing segments each having a root area and a tip area spaced from the root area. Structural means movably affixes the wing segments to the fuselage of the aircraft adjacent each other at the root areas for conjoint movement of the segments to a power position wherein the segments are substantially perpendicular to the fuselage, in which the wings are placed in a position that maximizes landing and take off performance, and spaced from each other and for conjoint movement of the segments to a cruise position wherein the segments are swept back at an angle with the fuselage and substantially in abutment with each other thereby forming a substantially unitary continuous surface airfoil.

Each of the wing segments has a leading edge and a trailing edge and the trailing edge of each of the mid and forward wing segments is shaped to fit in close contact with the leading edge of the next-succeeding wing segment.

Each of the wing segments is substantially pivotally affixed at its root area to the fuselage for movement in a plane substantially through the chord of the wing segment.

The control means comprises a plurality of pivot means each mounting a corresponding one of the wing segments and motion imparting means coupled to the wing segments for moving the wing segments at a controlled speed and direction in unison about the pivot means.

The motion imparting means comprises motor means, motor control means for controlling the motor means, coupling means coupling the motor means to the wing segments adjacent the pivot means and coupling means interposed between the motor means and the coupling means for controlling the speed and direction of movement of the coupling means.

BRIEF DESCRIPTION OF THE DRAWINGS

In order that the invention may be readily carried into effect, it will now be described with reference to the accompanying drawings, wherein:

FIG. 11 is a cross-sectional view, on an enlarged scale, taken along the lines XI—XI, of FIG. 9.

DETAILED DESCRIPTION OF PREFERRED EMBODIMENT

The segmented variable sweep wing of the invention is for an aircraft 1 having a fuselage 2 (FIGS. 1, 2, 3 and 5). The wing of the invention comprises a plurality of segments 3, 4 and 5, as shown in FIGS. 1 to 11. Although three segments are shown and described, the wing may be divided into any suitable number of segments, such as, for example, four, five or six.

Figure 1:
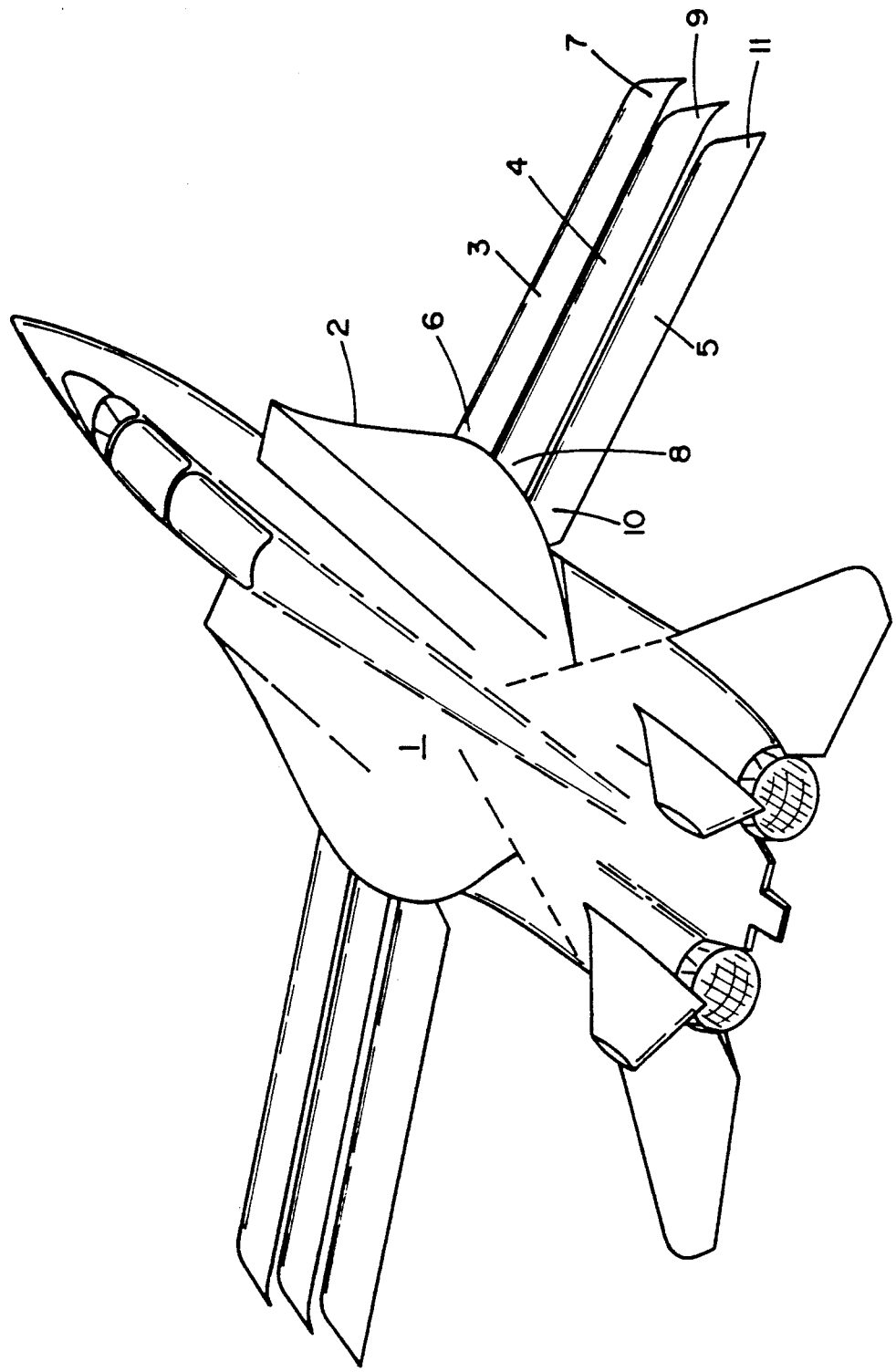
FIG. 1 is a perspective view of an embodiment of the segmented variable sweep wing of the invention and an aircraft on which said wing is installed, said wing being shown in a power position.

Each of the wing segments 3, 4 and 5 has a root area and a tip area spaced from said root area. Thus, as shown in FIGS. 1 and 5, the wing segment 3 has a root area 6 and a tip area 7; the wing 4 has a root area 8 and a tip area 9 and the wing segment 5 has a root area 10 and a tip area 11.

Figure 3:
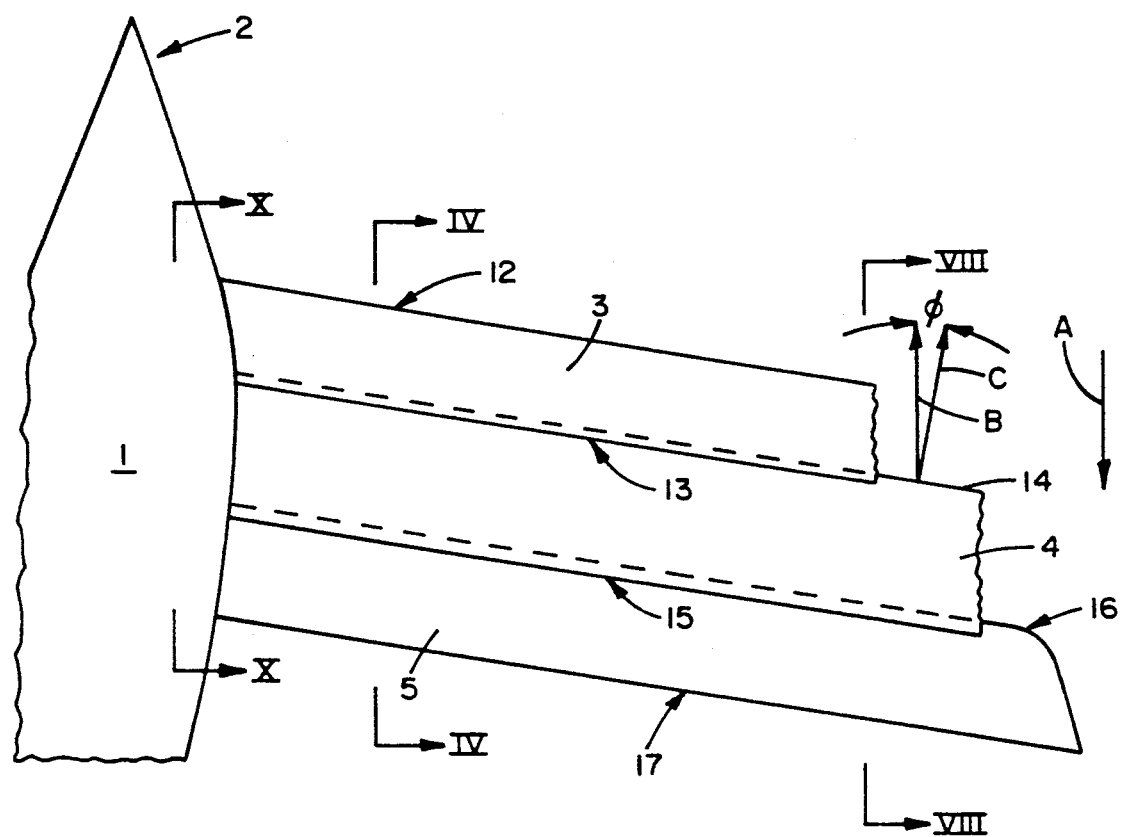
FIG. 3 is a top plan of the embodiment of FIG. 1 in a power, or high lift, position.
Figure 4:
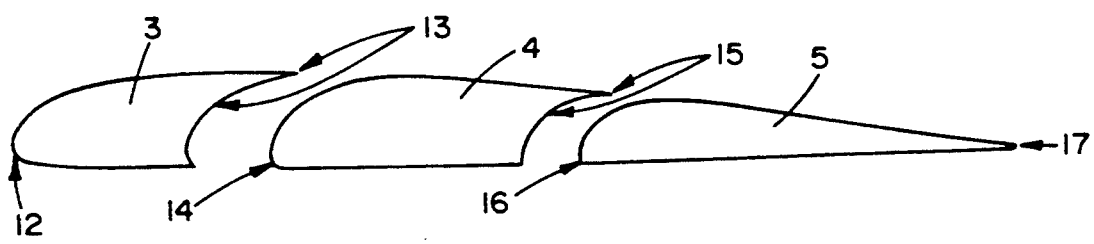
FIG. 4 is a cross-section view, taken along the lines IV—IV, of FIG. 3.
Figure 8:
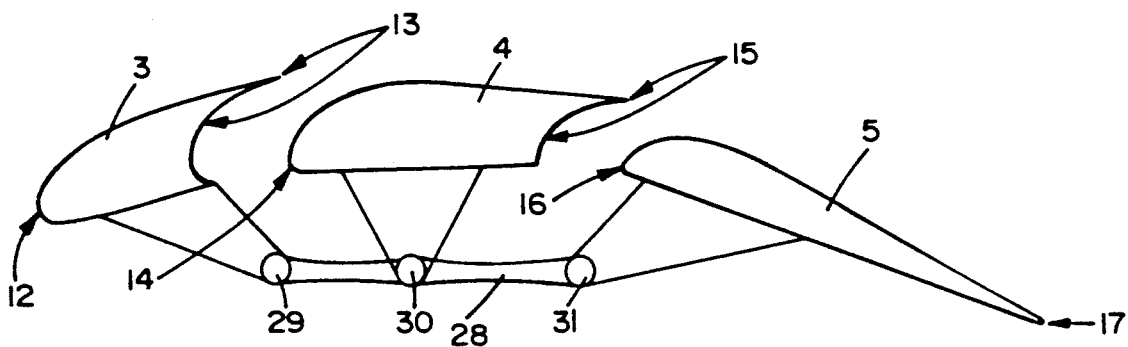
FIG. 8 is a cross-sectional view, taken along the lines VIII—VIII, of FIG. 3.

The wing segments 3, 4 and 5 are similar to each other in configuration and each of said wing segments has a leading edge and a trailing edge. Thus, the wing segment 3 has a leading edge 12 and a trailing edge 13, the wing segment 4 has a leading edge 14 and a trailing edge 15 and the wing segment 5 has a leading edge 16 and a trailing edge 17 (FIGS. 3, 4 and 8).

Figure 2:
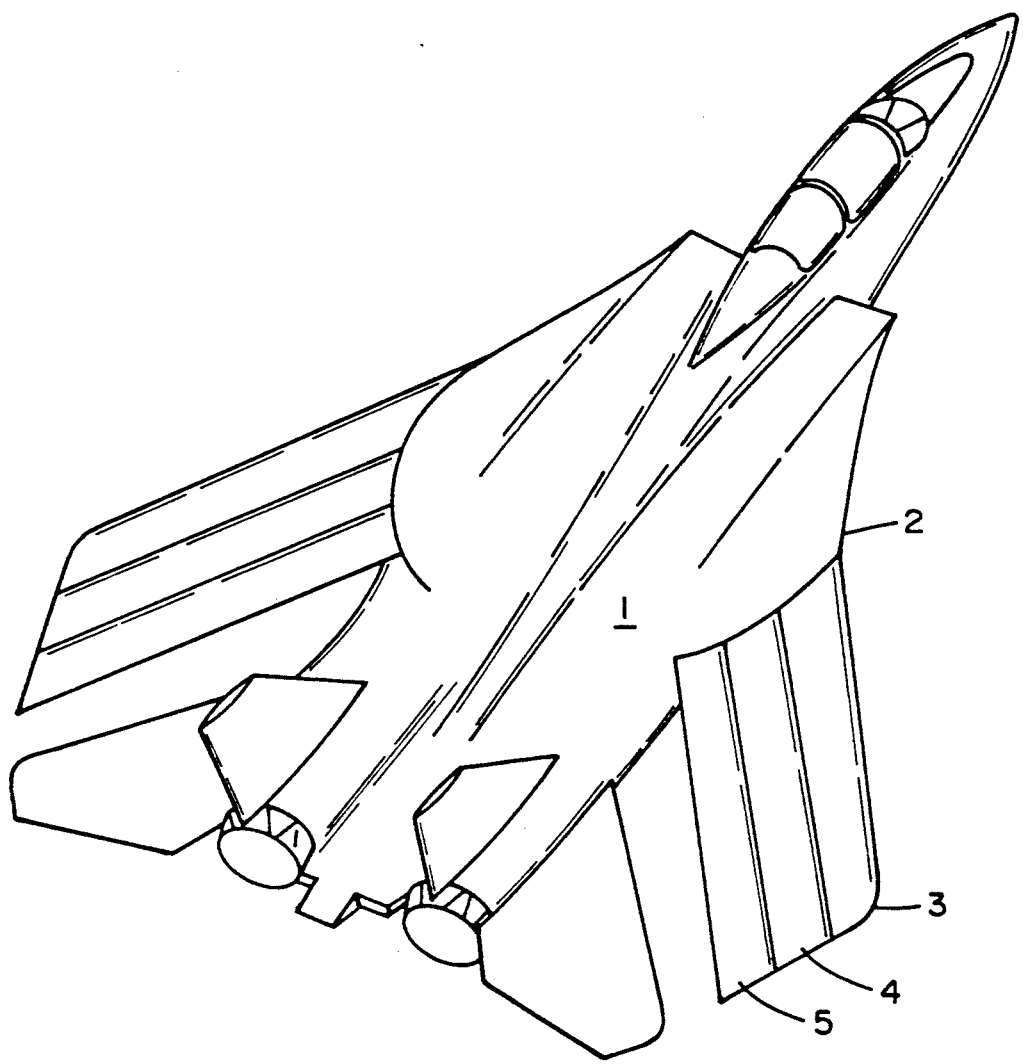
FIG. 2 is a perspective view of the embodiment of FIG. 1 of the invention and an aircraft on which the wing is installed, the wings being shown in a cruise position, or swept aft.
Figure 6:
FIG. 6 is a cross-sectional view, taken along the lines VI—VI, of FIG. 5.
Figure 7:
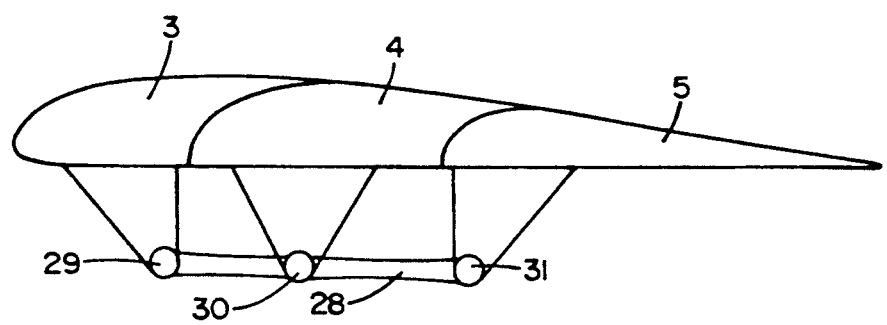
FIG. 7 is a cross-sectional view, taken along the lines VII—VII, of FIG. 5.

The trailing edge of each of the wing segments 3, 4 and 5 is shaped to fit in close contact with the leading edge of the next-succeeding wing segment. Thus, as shown in FIGS. 2, 6 and 7, the trailing edge 13 of the first wing segment 3 is shaped to fit in close contact with the leading edge 14 of the next-succeeding wing segment 4 and the trailing edge 15 of said wing segment 4 is shaped to fit in close contact with the leading edge 16 of the next-succeeding, and in the illustrated example, last wing segment 5.

Figure 5:
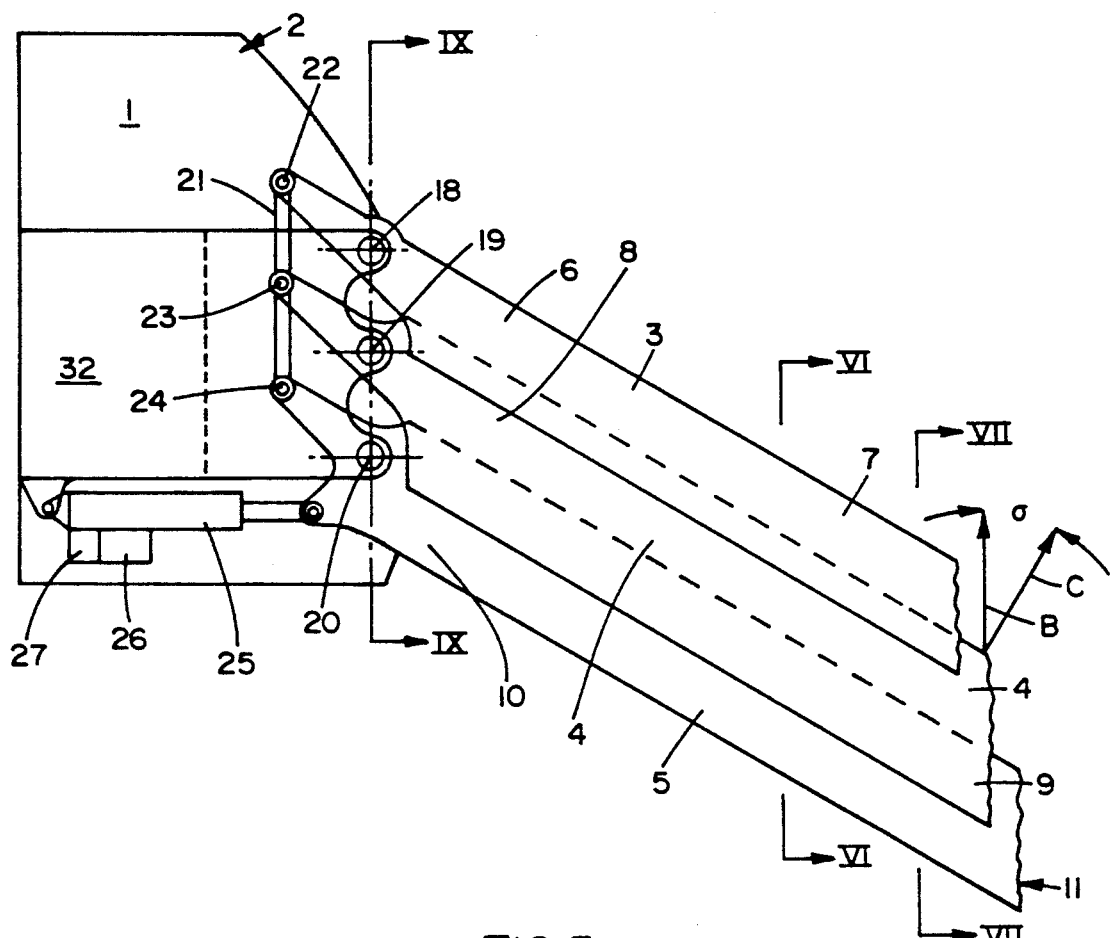
FIG. 5 is a top plan of the embodiment of FIG. 1 in a cruise position.

A structural connection or device movably affixes the wing segments 3, 4 and 5 to the fuselage 2 of the aircraft 1 adjacent each other at their root areas 6, 8 and 10 respectively, as shown in FIG. 5. The structural device conjointly moves the wing segments 3, 4 and 5 to a power position (FIGS. 1, 3 and 8) wherein said segments are substantially perpendicular to the fuselage 2 and spaced from each other, as shown in FIG. 3. This provides high lift necessary to assist in take off and landing. The structural device also conjointly moves the wing segments 3, 4 and 5 to a cruise position (FIGS. 2, 5, 6 and 7) wherein said segments are swept back at an angle with the fuselage 2 and in abutment with each other, as shown in FIG. 5, thereby forming a substantially unitary continuous surface airfoil.

The structural device comprises a plurality of pivot members or pins 18, 19 and 20 (FIG. 5) each mounting a corresponding one of the wing segments. Thus, the wing segment 3 is mounted on the pivot member 18, the wing segment 4 is mounted on the pivot member 19 and the wing segment 5 is mounted on the pivot member 20. A motion coordination device 21 is coupled to the wing segments 3, 4 and 5 for moving said wing segments at a controlled speed and direction in unison about the pivot members 18, 19 and 20.

The motion coordination device 21 is connected to the wing segment 3 at a pivot 22, to the wing segment 4 at a pivot 23 and to the wing segment 5 at a pivot 24, as shown in FIG. 5. The pivot members 18, 19 and 20, the structural device and the pivots 22, 23 and 24 form parallelograms to create uniform motion of the wing segments 3, 4 and 5.

A motion imparting device 25, as shown in FIG. 5, comprises a motor 26 of any suitable known type, such as, for example, an electric or hydraulic motor. A motor control 27 of any suitable known type, such as, for example, an electrohydraulic servo valve, controls the motor 26 (FIG. 5). The motor 26 provides power to the motion imparting device 25. The motion imparting device 25 may be a mechanical actuator, such as, for example, a ball-screw actuator of a hydraulic actuator, or a combination thereof. Motion of the wings is controlled by any suitable known electronics equipment via avionic equipment of the aircraft 1.

The structural device moves the wing segments 3, 4 and 5 in a direction A to change from power to cruise position (FIG. 3). The direction A is essentially parallel to the fore and aft centerline of the aircraft 1. The structural device also moves the wing segments 3, 4 and 5 in a direction B to change from cruise to power position (FIG. 5). The direction B is essentially parallel to the fore and aft centerline of the aircraft 1 and opposite the direction A.

A wing torsion device 28 connects the wing segments 3, 4 and 5 at pivots 29, 30 and 31, respectively (FIG. 7). The distance between the pivot members 18 and 19 is substantially equal to the distance between the pivots 22 and 23. By comparison, the distance between the pivots 29 and 30 is substantially smaller. The distance between the pivot members 19 and 20 is substantially equal to the distance between the pivots 23 and 24. By comparison, the distance between the pivots 30 and 31 is substantially smaller. The pivots 29, 30 and 31 are located somewhat below the wing, such that any forces developed in the wing torsion device 28 will act to cause a twist in the wing segments 3 and 5. The force in the wing device 28 between the pivots 29 and 30 is opposite in direction to the force in said wing torsion device between the pivots 30 and 31 such that the forces substantially cancel each other from acting on the wing segment 4, resulting in little or no twist of said wing segment.

Starting at the cruise position, the wing segments 3, 4 and 5 are positioned at an angle $\sigma$ with respect to a line B (FIG. 5). In the cruise position, all the wing segments 3, 4 and 5 are in close contact with each other, as shown in FIGS. 2, 5 and 6. The structural device causes the motion imparting device 25 to move the wings from the cruise position to the power, or high lift position, whereby the wings reach an angle $\phi$ with respect to the line B (FIG. 3). The wing segments 3, 4 and 5 separate from each other as the wings move from the cruise position to the power position. The separation between the wing segments 3, 4 and 5 is measured in a direction C normal to the leading edge of the wing segment 4 (FIG. 3) and is determined by the geometric relationship between the pivot points according to the equation $$\Delta c = h (\cos \phi - \cos \sigma)$$

where h, by example, is the center-to-center distance between the adjacent wing pivot members and $\Delta c$ is the separation distance between adjacent wing segments measured in a direction normal to the leading edge of the wing segment 4.

Similarly, the wing segments 4 and 5 separate from each other as the wings move from the cruise position to the power position. The final position, measured in a direction normal to the leading edge of the wing segment 4, is determined by the geometric relationship between the pivot member 19 and the pivot member 20, defined as $h_i$. The distance $c_i$ between the wing segment 4 and the wing segment 5 varies according to the equation $$\Delta c_i = h_i (\cos \phi - \cos \sigma)$$

Moreover, the separation distance is also a function of the fact that the wings are designed to be in close proximity to each other with the wings in the cruise position. As the wings sweep forward, when looked at in the B direction, the cross-sectional elements are foreshortened, hence, creating more distance between the wing segments.

The pivots 22 and 23 are the same distance h apart as the pivot members 18 and 19, and forming a parallelogram. By comparison, the pivot 29 is at a substantially smaller distance from the pivot 30. As the wings move from the cruise position to the power position, the wing segment 3 is prevented from reaching the position governed by the aforementioned parallelogram geometry due to the smaller distance between the pivot 29 and the pivot 30. A force develops in the wing torsion device 28 which prevents the wing segment 3 from reaching its final position. The force in the wing torsion device 28 causes a twist to develop in the wing segment 3 that starts at a minimum at the root area 6 and ends at a maximum at the tip area 7.

Similarly, the pivots 23 and 24 are the same distance apart as the pivot members 19 and 20 and forming a parallelogram. As the wings move from the cruise position to the power position, the wing segment 5 is prevented from reaching the position governed by the aforementioned parallelogram geometry due to the smaller distance between the pivot 30 and the pivot 31. A force develops in the wing torsion device 28 which prevents the wing segment 5 from reaching its final position. The force in the wing torsion device 28 causes a twist to develop in the wing segment 5 that starts at a minimum at the root area 10 and ends at a maximum at the tip area 11.

The induced twist in the wing segment 3 is opposite in direction to the induced twist in the wing segment 5 and results in the leading edge 12 of said wing segment 3 twisting down and the trailing edge 17 of said wing segment 5 twisting down. The deflected shape of the wing offers aerodynamic performance benefits by increasing the camber of the wing, with the camber reaching a maximum at the wing tip, where wings in general are most likely to sustain flow separation and to stall at high angles of attack. The pivots 29, 30 and 31 of the wing torsion device 28 are suitably fitted with bearings, such as spherical bearings, that permit misalignment resulting from relative movement between the wings as they move from the cruise to the power position.

The method of inducing twist in the wing segments 3 and 5 is not restricted to the aforementioned method, since variations are possible due to a great number of variations to the proportions of the four bar linkages defined by the pin and pivot points 18, 19, 23 and 22, the pin and pivot points 18, 19, 29 and 30, the pin and pivot points 19, 20, 24 and 23 and the pin and pivot points 19,20, 30 and 31.

As is hereinafter described, the same result of inducing twist in the wing segment 3 is achieved by setting the distance between the pin points 18 and 19 to be the same as the distance between the pivot points 29 and 30 and varying the distance between the pivot points 22 and 23. The same variations are also applicable to inducing twist in the wing segment 5, with the end result being the same. To clarify, the differential motion of the four bar linkages defined by the pin and pivot points 18, 19, 23 and 22 versus the motion defined by the pin and pivot points 18, 19, 29 and 30 causes the wing segment 3 to twist as the wings are moved from the cruise to the power position. Similarly, the differential motion of the four bar linkages defined by the pin and pivot points 19, 20, 23 and 24 versus the motion defined by the pin and pivot points 19, 20, 30 and 31 causes the wing segment 5 to twist as the wings are moved from the cruise to the power position. The amount of twist is controllable by substituting variable length devices, such as, for example, actuators, between the pivot points 22 and 23 and between the pivot points 23 and 24, in place of the motion coordination device 21. By so doing, it is possible to obtain tailored twists to optimize landing versus take off aerodynamic characteristics where, by example, the twist of the wing segments 3 and 5 is less for a take off situation than for a landing situation.

Figure 9:
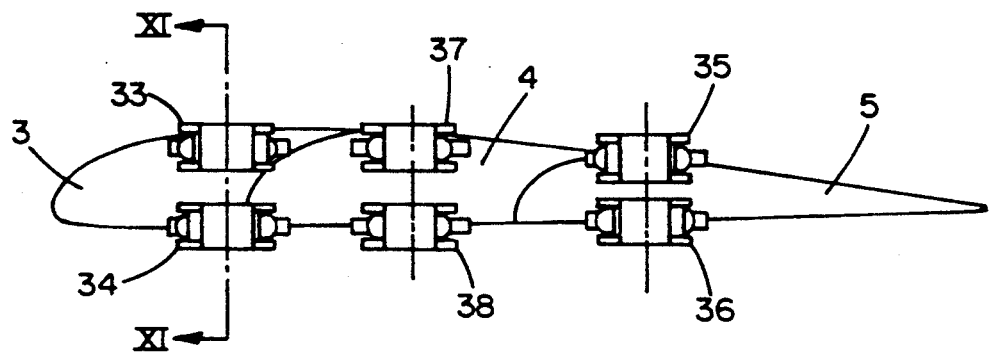
FIG. 9 is a cross-sectional view, taken along the lines IX—IX, of FIG. 5.
Figure 10:
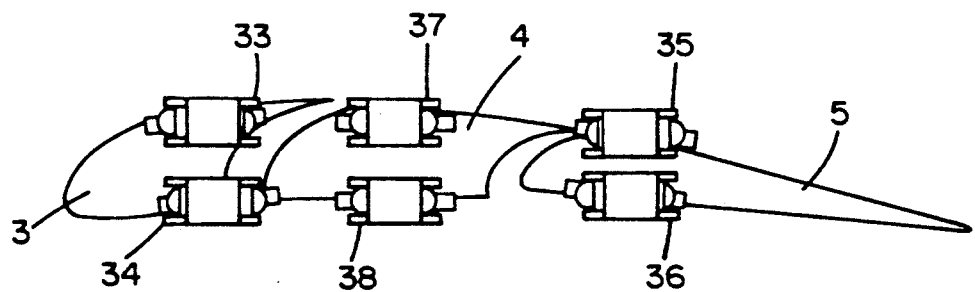
FIG. 10 is a cross-sectional view, taken along the lines X—X, of FIG. 3.

The wing segment 3 is structurally affixed to the fuselage 2 by a structural member 32 (FIGS. 5 and 11) and is pivotally connected to said structural member by pivot devices 33 and 34 (FIGS. 9, 10 and 11). The method of support is not restricted to spherical bearings. The wing segment 5 is similarly affixed to the fuselage 2 by the structural member 32 (FIG. 5) and is pivotally connected to said structural member by pivot devices 35 and 36 (FIGS. 9 and 10). The wing segment 4 is structurally affixed to the fuselage 2 by the structural member 32 (FIG. 5) and is pivotally connected to said structural member by pivot devices 37 and 38 (FIGS. 9 and 10). The pivot devices 33, 34, 35 and 36 are structurally different from the pivot devices 37 and 38 and include eccentric features and actuating means for controlling the eccentric features.

In FIG. 9, which shows the wings in the cruise position, the pivot devices 33 and 34 are aligned, so that their axes of rotation are positioned to most efficiently support the wing segment 3 substantially in alignment with the other wing segments. Similarly, the pivot devices 35 and 36 are aligned, so that their axes of rotation are positioned to most efficiently support the wing segment 5 substantially in alignment with the other wing segments. The pivot device 33 comprises a control 39, an actuator 40, such as, for example, planetary gearing, and eccentric bearing elements 41 connected to said planetary gearing, as shown in FIG. 11. The motor control 27 is coordinated mechanically or electronically with the control 39.

As the wings are moved from the cruise position to the power position, the pivot device 33 is actuated to mechanically shift the center of the eccentric bearing elements 41. Concurrently, the pivot device 34, which is of similar structure or construction to the pivot device 33, is actuated to shift eccentric bearing elements 42. The pivot device 34 also comprises a control 43 and an actuator 44, such as, for example, planetary gearing, as shown in FIG. 11. The shift in location of the center of the spherical bearings creates an instantaneous center of rotation whose axis is controlled to lie in a plane normal to the wing segment 3, said axis being closely aligned with direction C (FIG. 5). Similarly, pivot devices 35 and 36 are aligned, so that their axes of rotation are positioned to most efficiently support the wing segment 5, said axes being substantially in alignment with each other.

The pivot devices 33 and 35 are similar to each other in structure or construction and comprise the control 39, the actuator 40 and the eccentric bearing elements 41 connected to the planetary gearing of said actuator. As the wings are moved from the cruise position to the power position, the pivot device 35 is actuated to mechanically shift the center of the eccentric bearing elements 41. Concurrently, the pivot device 36, which is of similar structure or construction to the pivot device 34, is actuated to shift the eccentric bearing elements 42. The shift in location of the center of the spherical bearings creates an instantaneous center of rotation whose axis is controlled to lie in a plane normal to the wing segment 5, said axis being closely aligned with the direction C (FIG. 5).

As the wings are moved from the cruise position to the power position, the wing segment 5 is rotated to assume a position illustrated by FIG. 10. Although the rotation of the wing segments 3 and 5 relative to the wing segment 4 is somewhat small, it reduces the amount of twist hereinbefore mentioned, thereby reducing induced structural stresses.

Although the invention has been shown and described in what is believed to be the most practical and preferred embodiment, it is apparent that departures from the specific method and designs described and shown will suggest themselves to those skilled in the art and may be made without departing from the spirit and scope of the invention. I, therefore, do not wish to restrict myself to the particular construction described and illustrated, but desire to avail myself of all modifications that may fall within the scope of the appended claims.

I claim:

1. A segmented variable sweep wing for an aircraft having a fuselage, said wing comprising
   a plurality of wing segments each having a root area and a tip area spaced from said root area; and
   structural means movably affixing said wing segments directly to said fuselage adjacent each other at their root areas for conjoint movement of said wing segments to a power lift position wherein said wing segments are substantially perpendicular to said fuselage in a substantially horizontal plane and spaced from each other and for conjoint movement of said wing segments to a cruise position wherein said wing segments are swept back at an angle with said fuselage in a substantially horizontal plane and substantially in abutment with each other thereby forming a substantially unitary continuous surface airfoil.

2. A segmented variable sweep wing as claimed in claim 1, wherein each of said wing segments has a leading edge and a trailing edge and the trailing edge of each said wing segments except for a last wing segments is shaped to fit in close contact with the leading edge of the next-succeeding wing segment and the trailing edge of each of said wing segments except said last of said wing segments is in close contact with the leading edge of the next-succeeding wing segment when said wing segments are swept back.

3. A segmented variable sweep wing as claimed in claim 1, wherein each of said wing segments is substantially pivotally affixed at its root area to said fuselage for movement in a plane substantially through the chord of said wing segment and is unrestricted in movement through said chord of said wing segment.

4. A segmented variable sweep wing as claimed in claim 1, wherein said structural means comprises a plurality of pivot means each mounting a corresponding one of said wing segments and motion imparting means coupled to said wing segments for moving said wing segments at a controlled speed and direction in unison about said pivot means.

5. If A segmented variable sweep wing as claimed in claim 4, wherein said motion imparting means comprises motor means, motor control means for controlling said motor means and motion imparting means coupling said motor means to said wing segments adjacent said pivot means.

6. A segmented variable sweep wing as claimed in claim 5, wherein said pivot means provides differential motion between said root area and said tip area of each of said wing segments.

7. A segmented variable sweep wing as claimed in claim 6, wherein said pivot means induces a twist of said wing segments to achieve variable camber of said wing.

8. A segmented variable sweep wing as claimed in claim 6, wherein said pivot includes a plurality of actuation means for varying the orientation of the axes of rotation of said segments.

9. A segmented variable sweep as claimed in claim 6, wherein said pivot means includes variable length means providing tailored twists to optimize landing versus take off aerodynamic characteristics.

10. A method of providing a segmented variable sweep wing with a plurality of wing segments each having a root area and a tip area spaced from said root area, for an aircraft having a fuselage, said method comprising the steps of
    movably affixing the plurality of wing segments directly to said fuselage positioned adjacent each other at their root areas for conjoint movement; and
    controlling the movement of said wing segments so that they are conjointly movable to a power lifting position wherein said wing segments are substantially perpendicular to said fuselage in a substantially horizontal plane and spaced from each other and so that said wing segments are conjointly movable to a cruise position wherein said wing segments are swept back at an angle with said fuselage in a substantially horizontal plane and substantially in abutment with each other thereby forming a substantially unitary continuous surface airfoil.

11. A method as claimed in claim 10, wherein each of said wing segments has a leading edge and a trailing edge, said method further comprising the step of shaping the trailing edge of each of said wing segments except for a last of said wing segments to fit in close contact with the leading edge of the next-succeeding wing segment, whereby the trailing edge of each of said wing segments except said last of said wing segments is in close contact with the leading edge of the next-succeeding wing segment when said wing segments are swept back.

12. A method as claimed in claim 10, further comprising the step of substantially pivotally affixing each of said wing segments at its root area to said fuselage for movement in a plane substantially through the chord of said wing segment whereby said each of said wing segments is unrestricted in movement through said chord of said wing segment.

13. A method as claimed in claim 10, further comprising the step of imparting motion to said wing segments at their root areas for moving said wing segments at a controlled speed and direction in unison.

14. A method as claimed in claim 13, wherein said motion imparted to said wing segments is differential motion between the root area and the tip area of each said wing segments.

15. A method as claimed in claim 14, further comprising the step of inducing a twist of said wing segments to achieve variable camber of said wing.

16. A method as claimed in claim 14, wherein said motion is imparted with a variation of the orientation of the axes of rotation of said wing segments.

17. A method as claimed in claim 15, wherein the induced twists are tailored to optimize landing versus take off aerodynamic characteristics.

* * * * *